No. 695,947. Patented Mar. 25, 1902.
C. ROBINSON.
FLUID PRESSURE ENGINE.
(Application filed Apr. 27, 1900.)
(No Model.) 5 Sheets—Sheet 2.

WITNESSES:
C. L. Belcher
Birney Hines

INVENTOR
Cyrus Robinson
BY
Wesley G. Carr
ATTORNEY.

No. 695,947. Patented Mar. 25, 1902.
C. ROBINSON.
FLUID PRESSURE ENGINE.
(Application filed Apr. 27, 1900.)
(No Model.) 5 Sheets—Sheet 3.
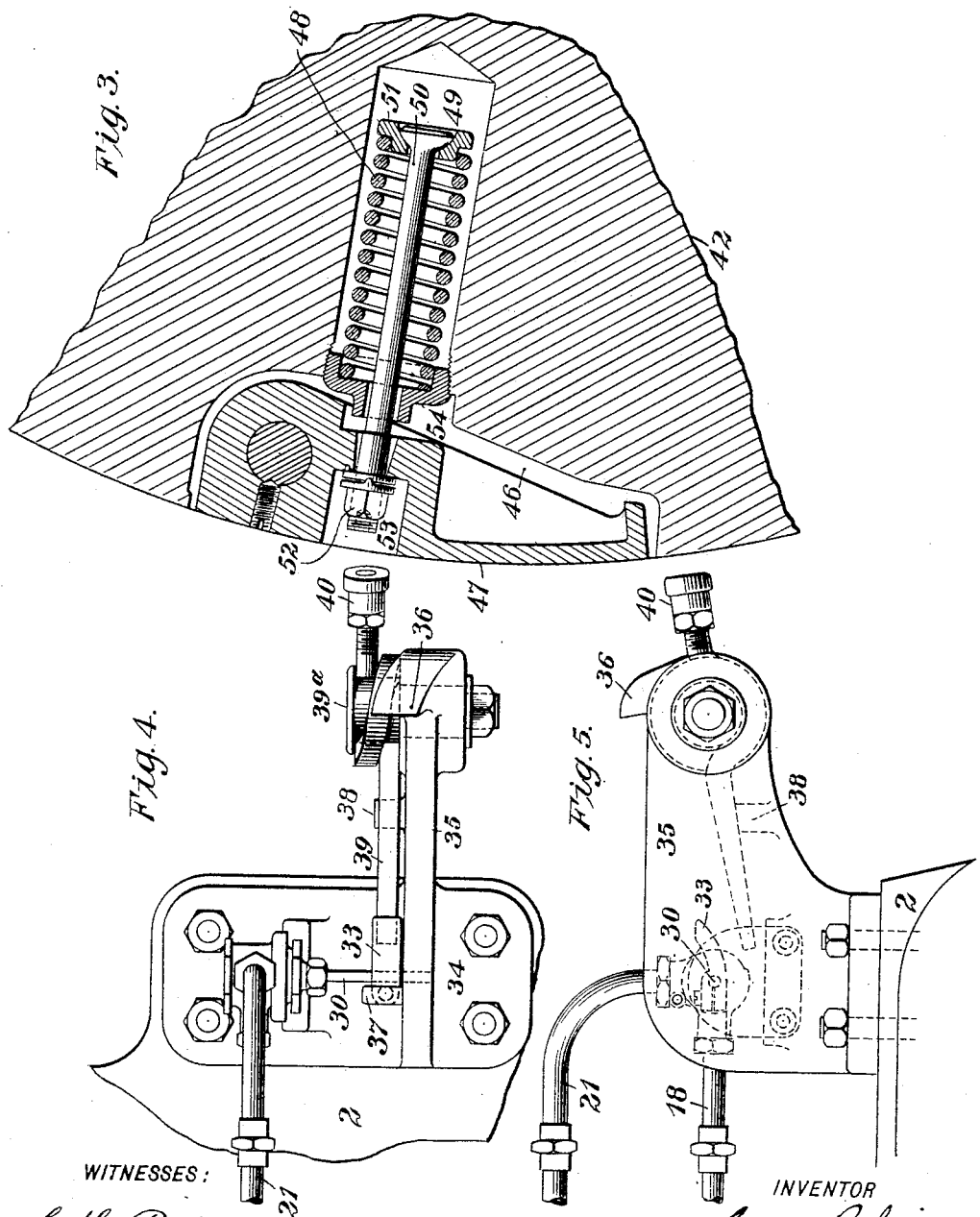
WITNESSES:
C. L. Belcher
Birney Hines
INVENTOR
Cyrus Robinson
BY
Wesley G. Carr
ATTORNEY.

No. 695,947. Patented Mar. 25, 1902.
C. ROBINSON.
FLUID PRESSURE ENGINE.
(Application filed Apr. 27, 1900.)
(No Model.) 5 Sheets—Sheet 4.
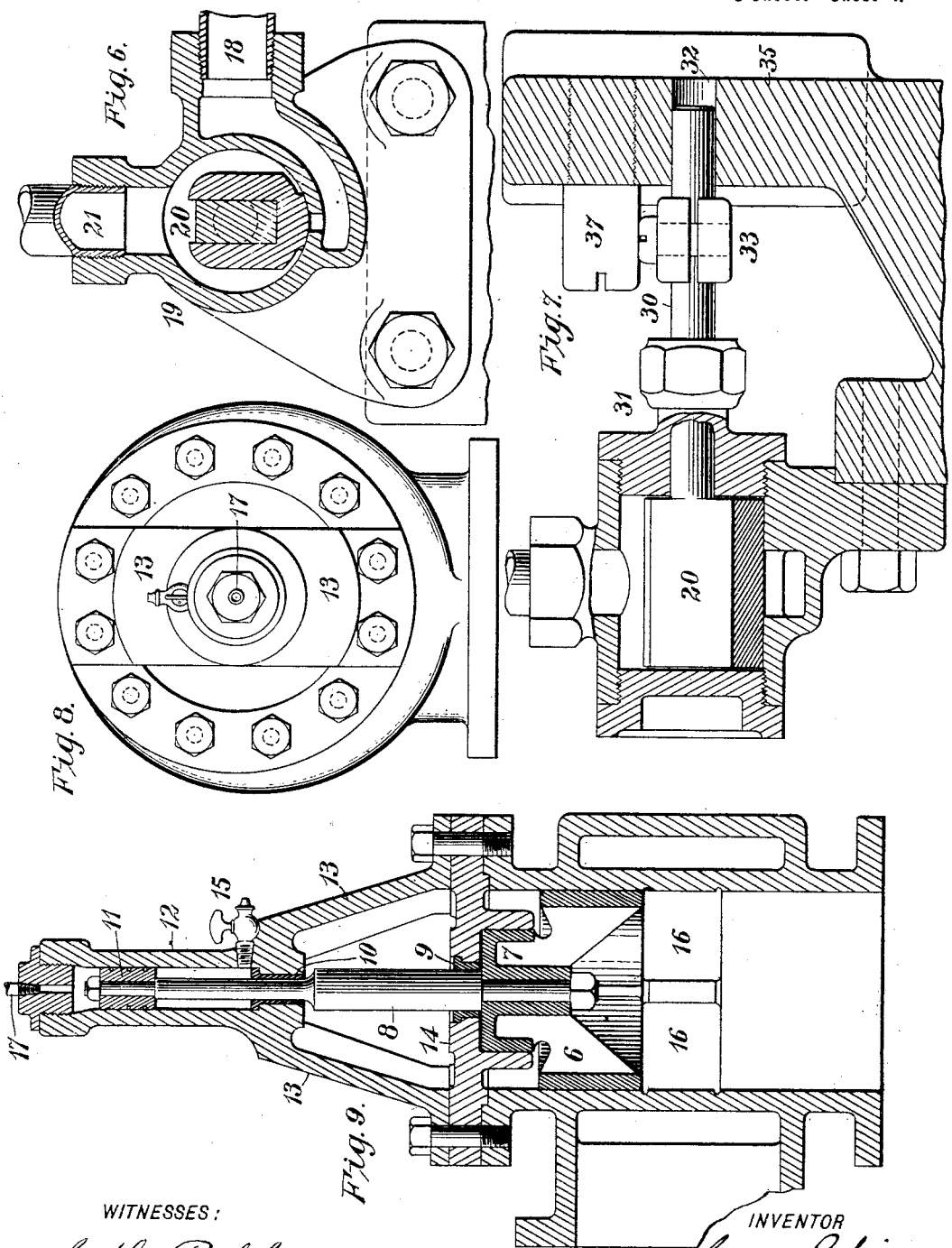
WITNESSES:
C. L. Belcher
Birney Hines
INVENTOR
Cyrus Robinson
BY
Finley G. Carr
ATTORNEY.
THE NORRIS PETERS CO., PHOTO-LITHO., WASHINGTON, D. C.

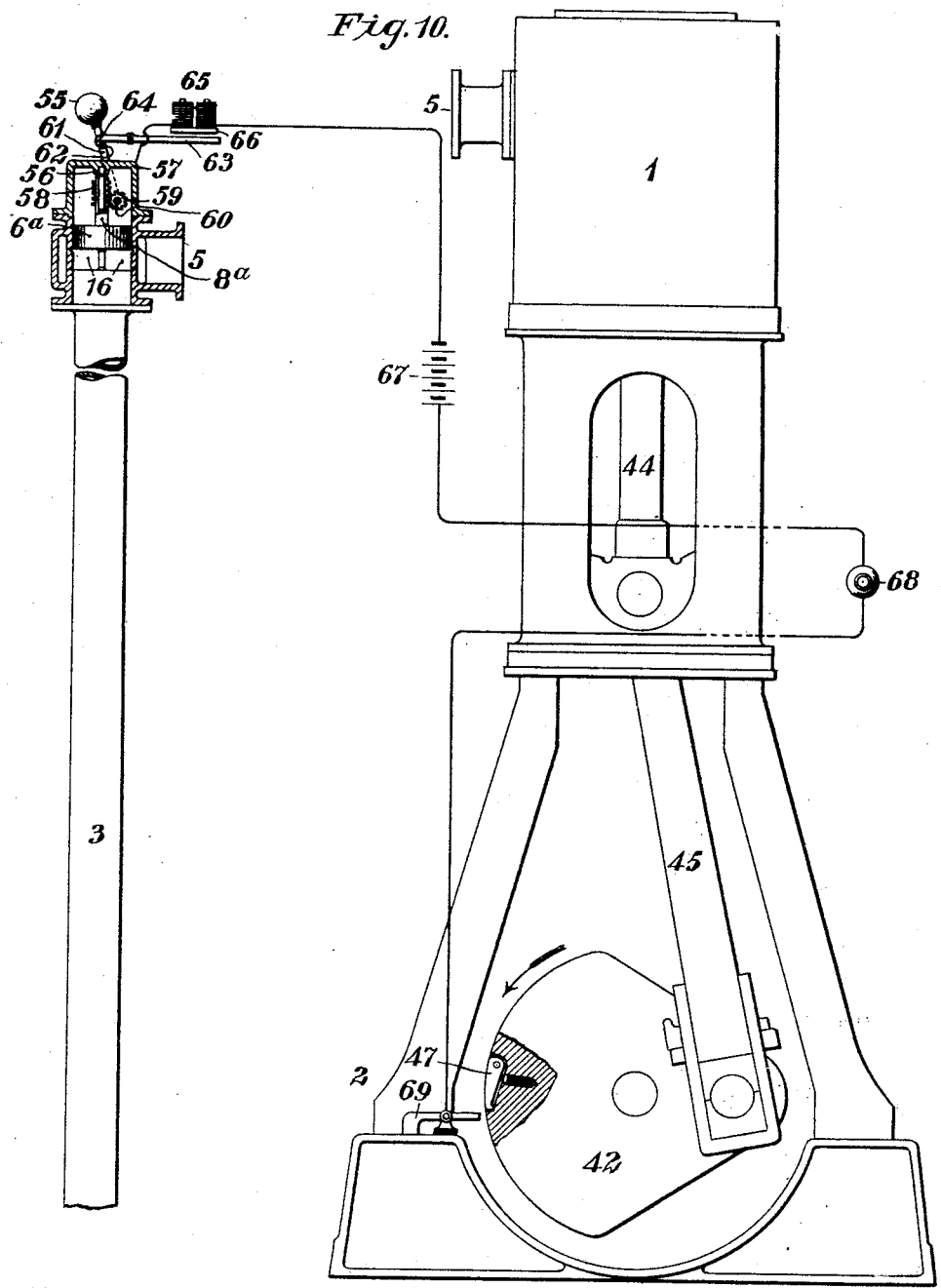

UNITED STATES PATENT OFFICE.

CYRUS ROBINSON, OF EDGEWOOD PARK, PENNSYLVANIA, ASSIGNOR TO THE WESTINGHOUSE MACHINE COMPANY, A CORPORATION OF PENNSYLVANIA.

FLUID-PRESSURE ENGINE.

SPECIFICATION forming part of Letters Patent No. 695,947, dated March 25, 1902.

Application filed April 27, 1900. Serial No. 14,640. (No model.)

*To all whom it may concern:*

Be it known that I, CYRUS ROBINSON, a subject of the Queen of Great Britain, residing at Edgewood Park, in the county of Allegheny and State of Pennsylvania, have invented a new and useful Improvement in Fluid-Pressure Engines, of which the following is a specification.

My invention relates to fluid-pressure engines, and particularly to means for automatically stopping such engines when their speed becomes excessive.

The object of my invention is to provide a simple and efficient means which will automatically cut off the supply of fluid-pressure to the engine when its speed increases beyond a safe limit and one which will be operated only by reason of an increase in speed.

A further object of the invention is to provide a governing or regulating system in which the main stop-valve will reset itself when the governing-valves are reset and one in which the apparatus is compactly and conveniently located and arranged to be operated either automatically or, if desired, by hand from any convenient point.

With these ends in view I have devised the means shown in the accompanying drawings, in which—

Figure 1:
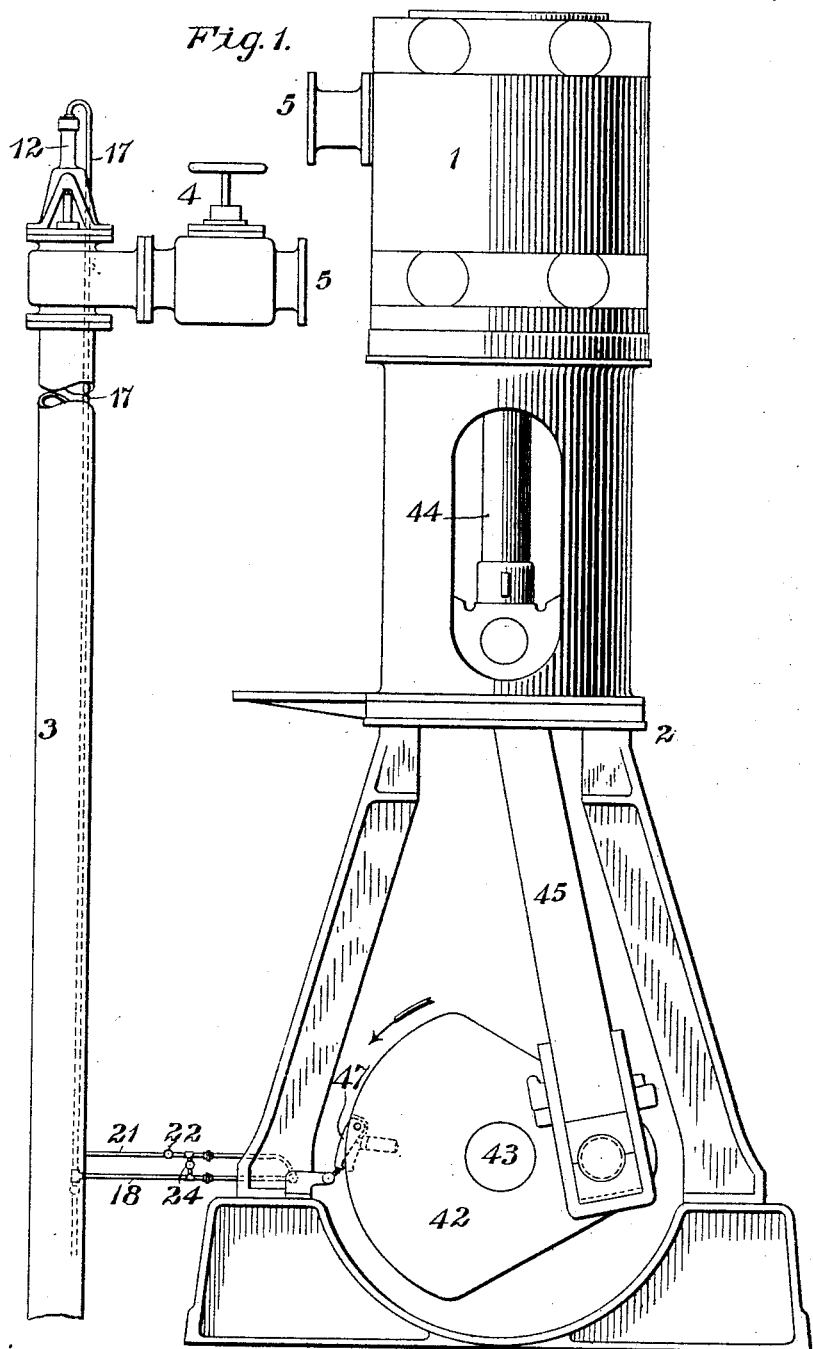
Figure 2:
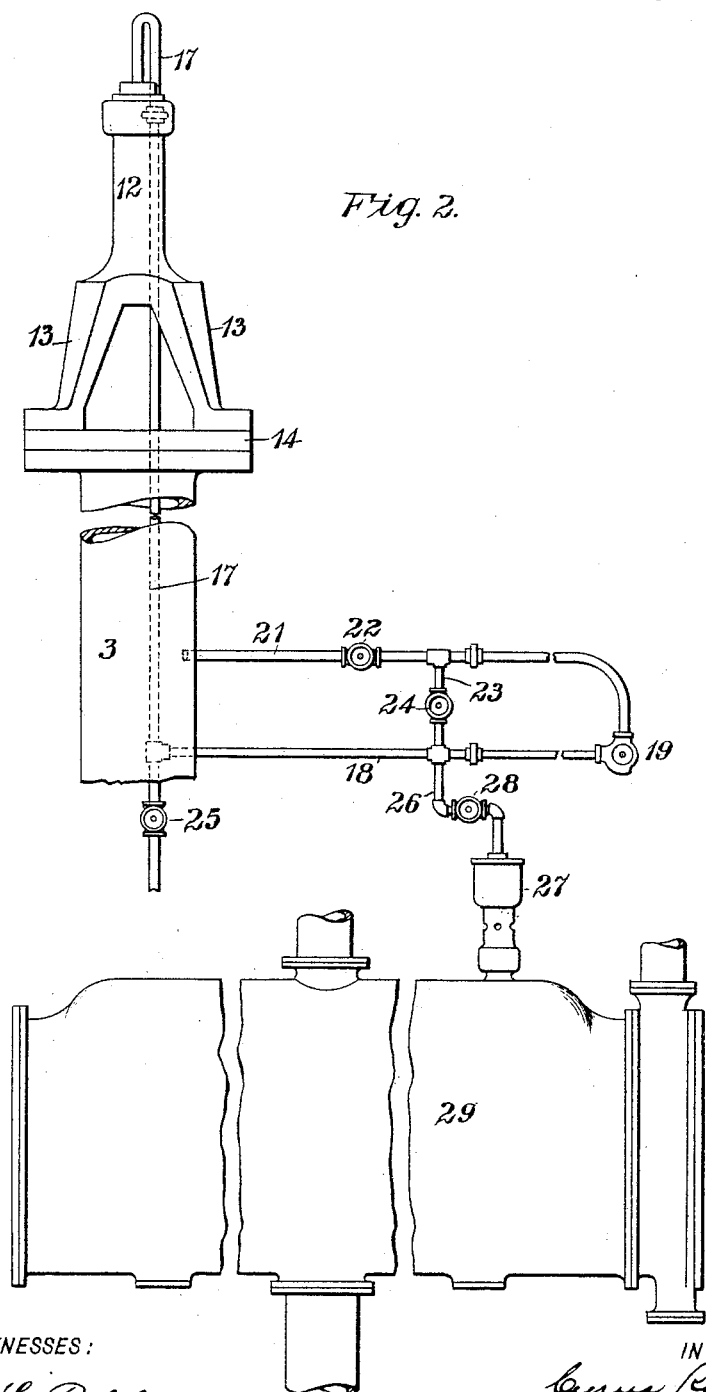

Figure 1 is a side elevation of a steam-engine, a portion of the steam-supply pipe being broken away and the valve-containing portion being displaced from its normal position. Fig. 2 is a side elevation of a condenser and the steam pipes and valves utilized in practicing my invention, portions of the condenser and main steam-pipe being broken away. Fig. 3 is a detail sectional view of a portion of a crank-cheek of the engine and the governing devices carried thereby. Fig. 4 is a detail plan view of the controlling-valve and its operating mechanism. Fig. 5 is a side elevation of the parts shown in Fig. 4. Fig. 6 is a transverse sectional view of the controlling-valve, its casing, and pipe connections. Fig. 7 is a longitudinal section of the controlling-valve, its supports, and operating devices. Fig. 8 is a plan view of the main valve and its operating mechanism. Fig. 9 is a longitudinal section of the main valve and its casing and operating mechanism. Fig. 10 is a side elevation, partially diagrammatic, of an engine provided with a modified form of my invention, the steam-supply pipe being displaced from its operative position the same as in Fig. 1.

I have shown my invention as applied to a steam-engine, and for convenience it will be so described, it being understood, however, that it is intended for use in connection with fluid-pressure engines of any kind or type to which it may be applicable.

Referring particularly to Figs. 1 to 9 of the drawings, the steam-engine cylinder 1, which is supported upon a suitable framework 2, is supplied with steam through a supply-pipe 3, having a hand-operated valve 4 in its horizontal part 5, adjacent to the cylinder, and a steam-operated valve 6 in the vertical portion adjacent to such horizontal portion. The valve 6 is provided with a cushion-plunger 7, which is rigid with the valve, both being mounted upon the lower end of a stem 8, operating in suitable stuffing-boxes 9 and 10. The upper end of the stem 8 is provided with a piston 11, which fits and operates in a cylinder 12, this cylinder being supported upon or, as shown, formed integral with standards 13, which are bolted to the upper end of the pipe 3, a partition-plate 14 being interposed between the two. A suitable cock 15 may be provided at the bottom of the cylinder 12, as indicated, for drawing off any water or steam that may accumulate below the piston 11.

The piston 11 is made of larger diameter than the lower end of the stem 8 or of so much of the stem as is subject to unbalanced pressure, so that if live steam of the pressure supplied to the engine-cylinder 1 be admitted to the cylinder 12 above the piston 11 it will force the piston downward, and thus cause the valve 6 to close the ports 16, leading to the engine-cylinder. Steam is conducted to the cylinder 12 above the piston 11 by a small pipe 17, which extends from the top of the cylinder to any convenient point and is connected by means of branch pipes and valves to the main steam-pipe 3. The branch pipe 18 leads directly to the casing 19 of controlling-valve 20, and a branch pipe 21 leads from the valve-casing 19 to the main steam-pipe 3, or, if desired, the pipe 21 might lead to any other receptacle containing live steam. The two pipes 18 and 21 are connected by a pipe 23, in which is located a hand-operating valve 24, this pipe 23 being of any desired length and so disposed that the valve 24 may be within convenient reach of the engineer. By means of this arrangement the engine may be shut down at any time by merely opening a small hand-valve which may be located at any point in the power-house that is found to be most convenient. The pipe 17 is provided at a point below the branch pipe 18 with a hand-operated valve 25, beyond which the pipe may communicate with the atmosphere. I may also utilize steam-pressure for reducing or destroying the condenser-vacuum when the speed of the engine becomes excessive, a means for this purpose being shown in Fig. 2 of the drawings and comprising a branch pipe 26, leading from pipe 18 to a cylinder 27 and containing a hand-operated valve 28. The connection to the cylinder 27 might obviously be made directly from pipe 17, if desired. The cylinder 27 may contain any suitable piston and valve device for admitting air to the condenser 29, such devices being well known.

The governing-valve 20, Figs. 3 to 7, is carried by a shaft 30, which is mounted in bearings 31 and 32, as indicated in Figs. 4 and 7. Clamped to the shaft 30, adjacent to its outer bearing 32, is a projecting arm 33, which is utilized for the purpose of opening and closing the valve. The stand 34, which supports the controlling-valve and its operating mechanism, is bolted to the frame 2 of the engine and has an arm 35, in which the bearing 32 is located, said arm being provided at its outer end with an upwardly and laterally projecting stop-piece 36, at its inner end with a stop-pin 37, and intermediate its ends with a laterally-projecting stop piece or lug 38. Its outer end is also provided with a stud 39$^a$, which constitutes a support for a tripping-lever 39, said lever being coiled about the pin so as to constitute a spring, and having its free ends projecting in opposite directions. One end of the lever normally projects beneath the arm 33, carried by the valve-shaft 30, and the other end is provided with an adjustable head 40, as indicated. The crank-cheek 42 of the engine that is employed for the purpose of transmitting motion to the shaft 43 from the piston through the piston-rod 44 and pitman 45 has a recess 46 in its front face in which is pivoted a block 47, the block being normally held in position, so that its outer face is substantially flush with the outer face of the crank-cheek, by means of a coiled spring 48, seated in a recess 49, and a bolt 50, which projects through the spring and is provided with an annular head 51 at its inner end, against which the inner end of the spring bears, and with an adjustable nut 52 on its outer end bearing against the rear wall of a recess 53 in the pivoted block 47. The outer end of the coiled spring bears against a cap-piece 54, that is screwed into the outer end of the recess 49, which contains the spring. The pressure exerted by this coiled spring for holding the pivoted block 47 in position may obviously be varied to suit any conditions of service by adjusting the nut 52 on the outer end of the bolt 50.

When the engine is running at normal speed or when its speed does not exceed that for which the controlling devices have been set, the block 47 will rest in its seat in the crank-cheek substantially as indicated in Fig. 3, and will therefore clear the head 40 on the outer end of the tripping-lever 39, Figs. 3 and 5 being so disposed as to show the parts in operative relation. When the speed of the engine becomes excessive, centrifugal force will throw the free end of the block outward against the action of the spring 48 into the position indicated in Fig. 1 of the drawings, it being assumed, of course, that the shaft rotates in the direction indicated by the arrow. When the block is thrown out into this position, it strikes the head 40 on the end of the tripping-lever 39 and turns such lever quickly on its pivot, so that its inner end strikes against the arm 33 on the controlling-valve shaft and throws it upward to such a degree as to open communication between the main steam-pipe and the upper end of the cylinder 12 through pipes 21, 18, and 17, it being assumed that when this operation takes place the valve 22 is open and the valves 24 and 25 are closed. Since the steam-pressure exerted upon the piston 11 will overbalance the upward pressure exerted in opposition thereto, the main valve 6 will be forced downward and close communication between the main steam-pipe and the engine-cylinder.

As indicated in Figs. 4 and 5, the tripping-lever 39 normally rests upon the laterally-projecting lug 38, and when it is thrown upward by the action of the block 47 it will strike against the stop 36, the spiral-spring structure of the portion that receives the stud 39$^a$ enabling the lever to receive these sharp blows without injury to it. If it is now desired to reset the apparatus for operation, the valve 20 will be closed and the valve 25 opened, thus permitting the steam to exhaust from above the piston 11. The steam-pressure beneath the main valve will then force it upward, and thus open communication between the main steam-pipe and the main cylinder. This is an important feature, since it enables the engineer to start the engine readily by manipulating two small valves which may be located at any convenient point in the power-house without regard to the location of the engine.

In case the engine is of the condensing type the valve 28 may be left open, so that when steam is admitted to the pipe 18 it will pass to the cylinder 27 and serve to destroy or partially destroy the vacuum in the condenser, and thus aid in stopping the engine.

Communication between the main steam-pipe and the controlling-valve may be cut off when desired by means of the valve 22.

In Fig. 10 I have shown an engine like that illustrated in the preceding figures. Instead of employing fluid-pressure for closing the stop-valve $6^a$ in the main supply-pipe 3, however, I utilize a weight 55, that is released electromagnetically, the breaking of the electric circuit being effected by means of the block 47, that is located in the crank-cheek 42 of the engine and is thrown out by centrifugal force when the speed of the engine becomes excessive in the same manner as in the form already described. The several parts, except as will be hereinafter specified, are the same as in the preceding figures, and the description heretofore given, therefore, may be read in connection with what is shown in this figure. The stop-valve $6^a$, located in the supply-pipe 3, is provided with an upwardly-projecting stem $8^a$ (here shown as hollow) and guided by means of a rod 56, which projects downwardly from a cap 57 at the top of the main pipe. The stem $8^a$ is provided with a rack 58, which meshes with a pinion 59, the latter being mounted upon a short shaft 60, to which is rigidly attached one end of an arm 61, the other end being provided with the weight 55 and at a suitable point intermediate its ends with a lug or pin 62. A locking-lever 63 is pivoted to a suitable support and has a hook 64, which normally engages with the pin or lug 62 on the arm 61 and holds the weight in the elevated position shown in the drawing. A double solenoid 65 is located above the free end of the lever 63, it being understood, however, that a magnet having a stationary core may be employed in lieu of the solenoid, if desired. The cores of the double solenoid are connected at their lower ends by means of a block or plate 66 of such weight that when the solenoids are deënergized the cores and the plate or block will drop with sufficient force to tilt the lever 63, and thus release the weight 55 and allow it to fall and by means of the pinion 59 and rack 58 lower the valve $6^a$, so as to close the ports 16. The solenoids 65 are normally energized by means of current from a suitable source of energy, such as a battery 67, and the circuit includes a switch 68, (here shown as of the push-button type,) the switch being so disposed as to maintain the circuit closed except when manipulated by hand. This push-button may obviously be located at any convenient point in the power-house, so as to enable the engineer to shut down the engine whenever desired.

Pivotally mounted upon the frame 2 of the engine, but insulated therefrom, is a circuit making and breaking device, (here shown as a lever 69,) one end of which projects in proximity to the face of the crank-cheek, so that it will be engaged by the block 47 when the latter is thrown outward by centrifugal force. The other end of the lever 69 is normally held in contact with the frame of the engine by its own weight or by a spring.

Since the main supply-pipe and frame of the engine are made of conducting material and are electrically connected, it will be apparent that so long as the circuit-breaking lever and the push-button are in the positions indicated in the drawings the solenoid will be energized and the valve maintained in the position shown. If the circuit be interrupted, however, by either the action of the block 47 or that of the push-button, the weight 55 will be released and will instantly fall, and thereby move the valve $6^a$ to close the ports 16.

While I have shown and described specific mechanism for practicing my invention, I desire it to be understood that such mechanism may be varied within considerable limits without departing from the spirit and scope of the invention and that where electromagnetic controlling means are employed the arrangement may be such as to effect the closing of the stop-valve by closing the electric circuit instead of effecting such result by opening the circuit, as shown.

I claim as my invention—

1. In a steam-engine, the combination with a steam-supply pipe having an adjustable piston-valve, an operating-piston and a stem for rigidly connecting said valve and said operating-piston for said valve, of pipe connections between a live-steam holder or conduit and the cylinder containing said piston and means operated by the engine to admit steam to said cylinder, said means being operated only when the speed of the engine exceeds a predetermined limit.

2. In a steam-engine, the combination with a main supply-pipe having an adjustable piston-valve provided with a directly-connected operating-piston, of valved pipe connections between a body of live steam and the cylinder containing said operating-piston, and a device carried by the engine-shaft for opening said pipe connections, said device being movable into operative position by centrifugal force when the speed of the shaft exceeds a predetermined limit.

3. In a steam-engine, the combination with a main supply-pipe having an adjustable piston-valve provided with a directly-connected operating-piston, of a pipe connection between the main supply-pipe and the cylinder containing said operating-piston, a valve in said pipe connection, means for opening and closing said valve and a valve-opening device pivotally mounted on a crank-cheek of the engine, said device being thrown into operative position by centrifugal force when the engine speed exceeds a predetermined safe limit.

4. In a fluid-pressure engine, the combination with a main supply-pipe and a piston-valve for cutting off communication between said pipe and the engine-cylinder, a directly-connected actuating-piston for said valve and a cylinder therefor, a pipe connection between the main steam-pipe and said cylinder, a controlling-valve for opening said pipe connection, an operating-lever for said controlling-valve and a block pivotally supported by the crank-cheek of the engine so as to be moved by centrifugal force into position to strike said lever and effect the opening of the controlling-valve.

5. A controlling-valve for fluid-pressure engines having an operating-arm, in combination with a pivoted lever one end of which is normally located beneath said arm and the other end of which is located adjacent to the engine-crank, and a block so mounted upon said crank as to be thrown outward by centrifugal force to strike the adjacent end of the lever.

6. A valve-tripping lever embodying one turn of a spiral and projecting therefrom in opposite directions.

7. A valve-tripping lever embodying one turn of a spiral and projecting therefrom in opposite directions, in combination with a supporting-stud surrounded by said spiral.

8. In a fluid-pressure engine, the combination with a supply-pipe having a normally open main piston-valve, of a piston directly connected to said valve and operated by fluid-pressure to close the same, a controlling-valve and means for opening the same when the engine speed becomes excessive, said main valve being automatically closed by fluid-pressure upon opening the controlling-valve.

9. In a fluid-pressure engine, the combination with a supply-pipe having a main piston-valve provided with an operating-piston, of a cylinder for said operating-piston, a pipe connection between said cylinder and a source of fluid-pressure, a governing-valve and an exhaust-valve in said pipe connections, said main valve being opened by opening the exhaust-valve and closing the governing-valve.

10. In a fluid-pressure engine, the combination with a main supply-pipe having a piston-valve that is closed by the application of fluid-pressure to both of its ends and opened by the withdrawal of the pressure from one end, of means operated automatically when the engine speed becomes excessive to apply the valve-closing pressure and manually operated to withdraw such pressure when it is desired to start the engine.

11. A spring-lever embodying one turn of a spiral and projecting in approximately opposite directions therefrom, substantially as described.

12. A spring-lever embodying one turn of a spiral at a point intermediate its ends, in combination with a supporting structure having a bearing-stud upon which the spiral portion of said lever is mounted.

13. The combination with a spring-lever embodying one turn of a spiral and having an adjustable head at one end, of a supporting structure having a stud upon which said lever is mounted.

14. In an engine, a rotatable member having a part that is movable outwardly under the action of centrifugal force, in combination with a spring-lever that is bent to form one turn of a spiral and projects therefrom in opposite directions, a supporting structure having a bearing-stud for said lever and a valve having an arm located in the path of movement of one end of the lever.

In testimony whereof I have hereunto subscribed my name this 17th day of April, 1900.

CYRUS ROBINSON.

Witnesses:
  WM. DOWNTON,
  EDWIN RUND.